3,082,220
Δ²,⁴-STEROIDS OF THE ANDROSTANE AND PREGNANE SERIES AND PROCESS THEREFOR
Albert Bowers and Belig Berkoz, Mexico City, Mexico, assignors, by mesne assignments, to Syntex Corporation, a corporation of Panama
No Drawing. Filed Feb. 21, 1962, Ser. No. 174,680
24 Claims. (Cl. 260—397.3)

The present invention relates to certain novel cyclopentanophenanthrene derivatives and to a method for making the same.

More particularly the present invention relates to a method for making Δ²,⁴-steroid compounds of the androstane, pregnane and cortical series.

The novel compounds obtained by the method object of the present invention are represented by the following formulas:

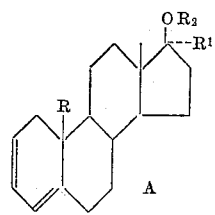

A

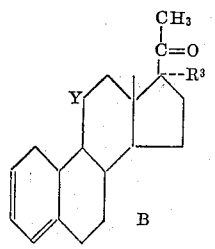

B

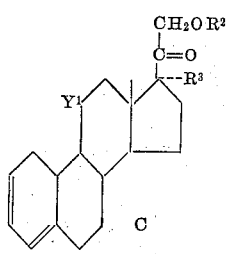

C

In the above formulas, R represents hydrogen or methyl; R' represents hydrogen, a lower alkyl group of up to 8 carbon atoms such as methyl, ethyl, propyl, isobutyl, etc.; a lower alkenyl group of 2 to 6 carbon atoms such as vinyl, propenyl and a lower alkinyl group such as ethinyl, propinyl etc.; R² represents hydrogen or a hydrocarbon carboxylic acid of less than 12 carbon atoms; R³ represents hydrogen, hydroxy or acyloxy; Y represents β-hydroxy or keto and Y¹ represents hydrogen, β-hydroxy or a keto group.

The acyl groups are derived from hydrocarbon carboxylic acids containing less than 12 carbon atoms which may be unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate and β-chloropropionate.

The compounds represented by Formula A are anabolic-androgenic agents with a particularly favourable anabolic/androgenic ratio. They are also anti-estrogenic and anti-gonadotropic agents, and lower the cholesterol level in the blood. The 17α-alkenyl and 17α-alkynyl compounds have in addition oral progestational activity.

The novel compounds represented by B are progestational agents wtih oral activity, useful in fertility control.

The compounds represented by C are anti-inflammatory agents with glycogen deposition activity; they also involute the thymus.

Compounds represented by Formulas B and C are also anti-estrogenic and anti-gonadotropic agents.

The surprising discovery has been made that when a 2α-iodo-Δ⁴-3-hydroxy steroid is heated with zinc-copper couple in acetic acid, dehydroxyhalogenation occurs, giving rise to the corresponding Δ²,⁴-compounds, as illustrated by the following equation:

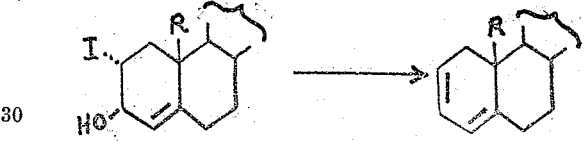

The reaction is preferably conducted at the steam bath temperature, for a period of time in the order of 1 to 2 hours.

Other substituents can be present in the molecule, such as for example, methyl groups at C–6 or C–16, hydroxy groups at C–16, etc.

The novel androstan compounds of the present invention are obtained by the method illustrated by the following sequence of reactions:

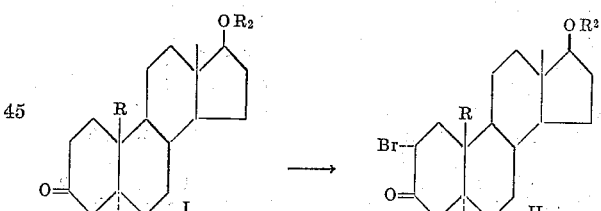

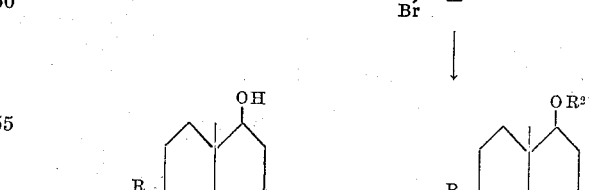

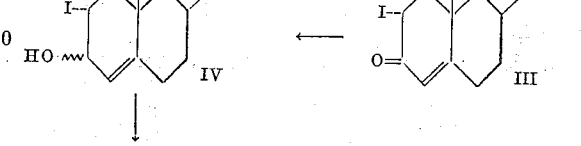

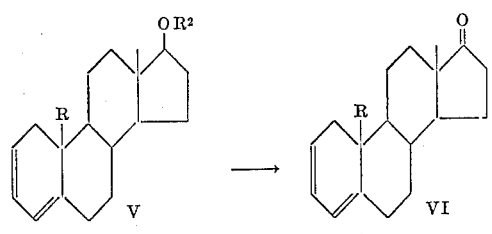
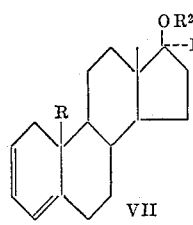

In the above formulas, R, $R^1$ and $R^2$ have the same meaning as heretofore set forth.

In practicing the process outlined above, dihydroallotestosterone or an ester thereof (I) is converted into the 2α,4α-dibromo compound (II) by following the method described by G. Rosenkranz et al. in J. Am. Chem. Soc. 72, 4077 (1950) which upon treatment with sodium iodide in acetone solution produces 2-iodo-testosterone or an ester thereof (III). Reduction of this compound with a double metal hydride, preferably with sodium borohydride in dioxane solution affords 2-iodo-$\Delta^4$-pregnene-3β,17β-diol in mixture with the 3α-isomer (IV). When the above mixture of diols is heated on the steam bath with zinc-copper couple in acetic acid, for a period of time of the order of 1 to 2 hours, there is produced $\Delta^{2,4}$-androstadien-17β-ol (V; $R^2$=H). Conventional esterification of this compound with acid anhydrides or chlorides of less than 12 carbon atoms in pyridine solution yields the corresponding esters (V; $R^2$=acyl).

In order to obtain the 17α-substituted compounds of the present invention, $\Delta^{2,4}$-androstadien-17β-ol is oxidized with chromic acid, preferably using the chromium trioxide-pyridine complex, thus giving $\Delta^{2,4}$-androstadien-17-one (VI). Treatment of this compound with an organometallic halide gives rise to the 17α-alkyl, 17α-alkenyl and 17α-alkynyl derivatives of $\Delta^{2,4}$-androstadien-17β-ol (VII; $R^2$=H), according to the Grignard reagent employed. The reaction is conducted at room temperature overnight or at reflux temperature for 2 to 5 hours. Adequate solvents for this reaction are the aromatic hydrocarbons such as benzene, toluene or xylene or other inert organic solvents such as ether or tetrahydrofuran.

Alternatively the 17α-alkyl substituted compounds may be obtained by treating $\Delta^{2,4}$-androstadien-17-one with an alkyl-lithium.

The 17α-alkynyl derivatives are also obtained by reaction of $\Delta^{2,4}$-androstadien-17-one with sodium or potassium acetylide or with the sodium or potassium salt of another alkine.

Upon treatment of these compounds with acid anhydrides or chlorides of the type previously mentioned, in benzene solution and in the presence of p-toluenesulfonic acid, there are produced the esters of 17α-alkyl, 17α-alkenyl and 17α-alkynyl-$\Delta^{2,4}$-androstadien-17β-ol (VII; R=acyl).

In a similar manner, starting from 19-nor-dihydroallotestosterone or an ester thereof, there are produced $\Delta^{2,4}$-19-nor-androstadien-17β-ol, the corresponding 17α-alkyl, alkenyl and alkynyl derivatives and esters.

In order to obtain $\Delta^{2,4}$-pregnadien-20-one and $\Delta^{2,4}$-pregnadien-21-ol-20-one, the method illustrated by the following equation is employed:

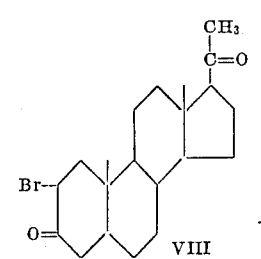
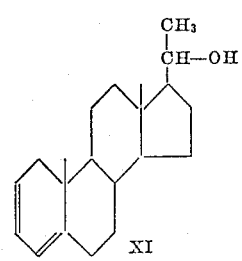
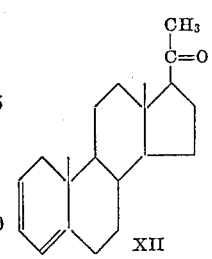
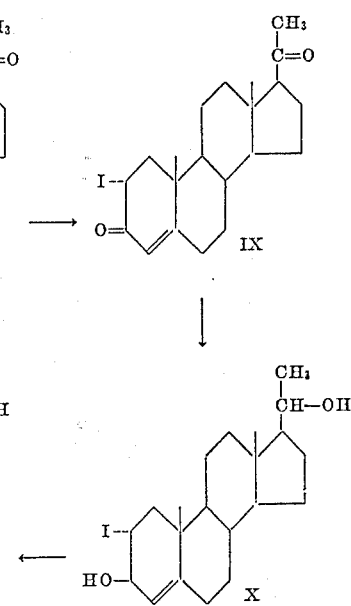
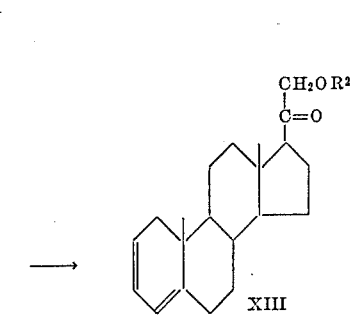

In the above equation, $R^2$ has the same meaning as previously described.

In practicing the process outlined above, 2α,4α-dibromo-allopregnane-3,20-dione (VIII) described by M. Rubin et al. in J. Am. Chem. Soc. 73, 2338 (1951) is treated with sodium iodide in acetone solution by following the method described by G. Rosenkranz et al. in J. Am. Chem. Soc. 72, 4077 (1950), thus giving 2-iodoprogesterone (IX). Reduction of this compound with a double metal hydride, preferably with sodium borohydride in dioxane solution gives 2α-iodo-$\Delta^4$-pregnene-3β,20β-diol (X) in mixture with the 3α-isomer. When the above compound is heated on the steam bath with zinc-copper couple in acetic acid, for a period of time in the order of 1 to 2 hours, there is produced $\Delta^{2,4}$-pregnadien-20β-ol (XI). Upon oxidation of the latter compounds with chromium trioxide in acetic acid or 8 N-chromic acid in acetone solution, there is produced $\Delta^{2,4}$-pregnadien-20-one (XII).

Treatment of the preceding compound with calcium oxide and iodine in mixture of tetrahydrofuran-methanol followed by reaction of the iodo compound, thus obtained with potassium acetate in acetone solution, in accordance with the method described by H. J. Ringold et al. in J. Am. Chem. Soc. 80, 250 (1958) gives rise to $\Delta^{2,4}$-pregnadien-21-ol-20-one acetate (XIII; $R^2$=CH$_3$—CO—), which upon saponification with dilute potassium hydroxide in methanol solution gives the free compound (XIII; $R^2$=H). Conventional esterification of the above compound with acid anhydrides or chlorides of less than 12 carbon atoms in pyridine solution produces the corresponding esters.

The $\Delta^{2,4}$-pregnadien-17α,21-diol-20-one as well as the corresponding 11-oxygenated derivatives are obtained by the method illustrated by the following equation:

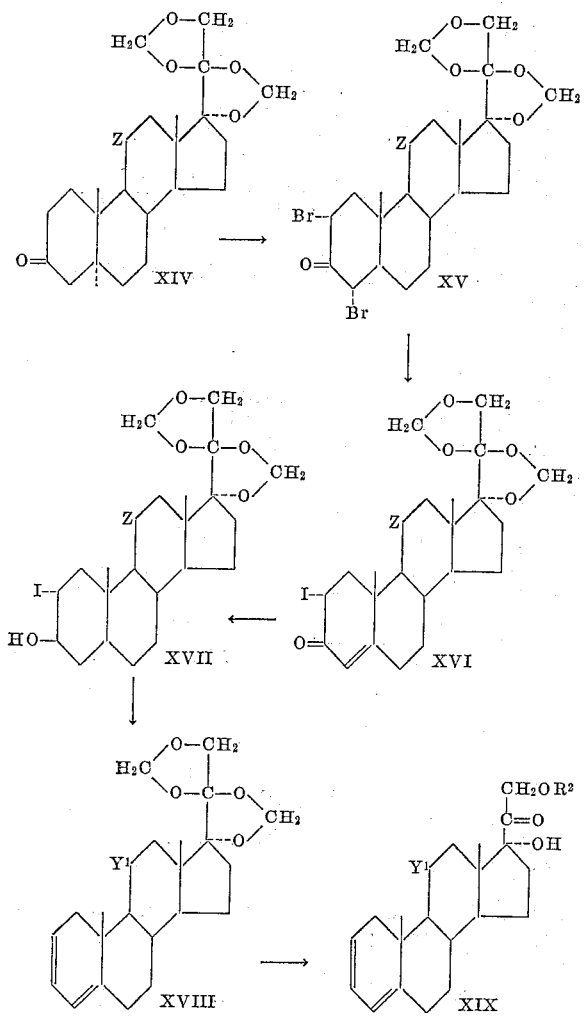

In the above equation, $R^2$ and $Y^1$ have the same meaning as previously set forth; and Z represents hydrogen or β-hydroxy.

In practicing the process outlined above, the 17,20;20,21-bismethylenedioxy-allopregnan-3-one or 17,20;20,21-bismethylenedioxy-allopregnan-11β-ol-3-one (XIV) are treated with 2 molar equivalents of bromine in acetic acid solution, and at 50° C. to give the corresponding 2α,4α-dibromo compounds (XV) which are then converted into the 2-iodo-Δ⁴- derivatives (XVI) by reflux with sodium iodide in acetone solution. Reduction of the preceding compounds with sodium borohydride produces the 3-alcohols, namely 2α-iodo-17,20;20,21-bismethylenedioxy-Δ⁴-pregnen-3β-ol and 2α-iodo-17,20;20,21-bismethylenedioxy-Δ⁴-pregnen-3β,11β-diol (XVII).

Upon reaction of the latter compound with zinc copper couple in acetic acid, there are produced the corresponding $\Delta^{2,4}$-pregnadienes (XVIII; $Y^1$=hydrogen, β-hydroxy).

Oxidation of 17,20;20,21-bismethylenedioxy-Δ²,⁴-pregnadien-11β-ol (XVIII; $Y^1$=β-hydroxy) with chromium trioxide in acetic acid or 8 N chromium trioxide in acetone solution produces 17,20;20,21-bismethylenedioxy-Δ²,⁴-pregnadien-11-one (XVIII; $Y^1$=keto).

The bismethylenedioxy group of the abovementioned compounds is then hydrolyzed preferably by treatment with 60% formic acid or 80% acetic acid, thus producing Δ²,⁴-pregnadiene-17α,21-diol-20-one, Δ²,⁴-pregnadiene-11β,17α,21-triol-20-one, Δ²,⁴-pregnadiene-17α,21-diol-11,20-dione (XIX; $R^2$=H).

Conventional esterification of these compounds with acid anhydrides or chlorides in pyridine solution give the corresponding 21-esters (XIX; $R^2$=acyl).

The corresponding 21-desoxy compounds are obtained by the process illustrated by the following sequence of reactions:

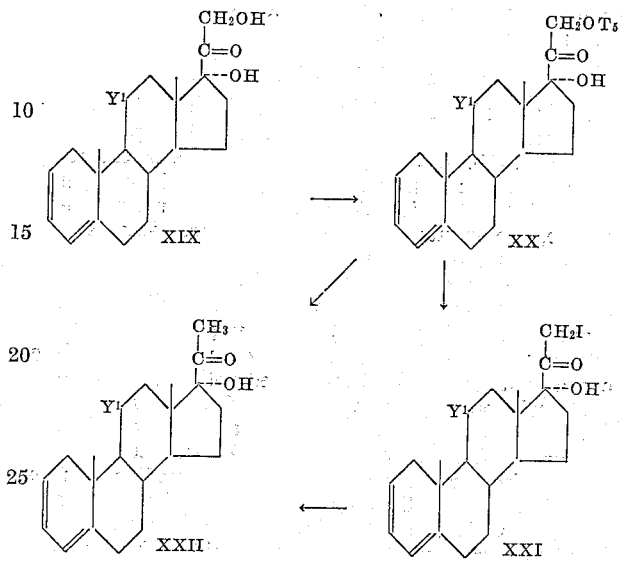

In the above formulas, $Y^1$ has the meaning heretofore indicated.

In practicing the process set forth above, Δ²,⁴-pregnadiene-17α,21-diol-20-one or the corresponding 11-oxygenated derivatives are converted into the corresponding 21-tosylates (XX) by reaction with p-toluenesulfonyl (tosyl) chloride in pyridine solution; the tosylate group is then substituted by iodine by reaction with sodium iodide in mixture with acetone, and finally the resulting 21-iodo compound (XXI) is deiodinated by treatment with sodium bisulfate in mixture with aqueous methanol or by reaction with chromous chloride in acetone, thus affording Δ²,⁴-pregnadien-17α-ol-20-one, Δ²,⁴-pregnadiene-11β,17α-diol-20-one and Δ²,⁴-pregnadien-17α-ol-11,20-dione (XXII).

These reactions may be modified within wide limits both with respect to the reagents and solvents employed as with respect to the conditions of temperature and time. Thus for example, instead of the 21-tosylates, there may be prepared the 21-mesylate or other 21-alkyl (aryl) sulfonate, which in turn may be converted in only one step into the desired 21-desoxy compound by refluxing with sodium iodide in mixture with acetic acid.

Upon esterification of Δ²,⁴-pregnadien-17α-ol-20-one and Δ²,⁴-pregnadien-17α-ol-11,20-dione with acid anhydrides or chlorides of less than 12 carbon atoms in benzene solution and in the presence of p-toluenesulfonic acid, there are produced the corresponding esters of such compounds.

The methods hereinbefore described for the preparation of Δ²,⁴-pregnadiene compounds (Formulas VIII to XXI) may also be applied to the 19-nor series, to produce the corresponding 19-nor-compounds, i.e., 19-nor-Δ²,⁴-pregnadien-20-one, 19-nor-pregnadien-17α-ol-20-one, 19-nor-Δ²,⁴-pregnadiene-21-ol-20-one, 19-nor-Δ²,⁴-pregnadiene-17α,21-diol-20-one, and the 11-oxygenated derivatives thereof.

The following specific examples serve to illustrate but are not intended to limit the scope of the present invention:

*Preparation 1.*—To a solution of 5 g. of allopregnane-17α,21-diol-3,20-dione in 200 cc. of chloroform were added 40 cc. of 37% aqueous formaldehyde and 5 cc. of concentrated hydrochloric acid and the mixture was stirred for 48 hours at room temperature. The two layers were separated; the aqueous layer was washed with chloroform and the combined organic solutions were washed with water to neutral, dried over anhydrous sodium sulfate and evaporated to dryness. The residue was recrystallized from methanol-ether, thus affording 17,20;20,21-bismethylenedioxy-allopregnan-3-one.

In a similar manner, allopregnane-11β,17α,21-triol-3,20-dione was converted into 17,20;20,21-bismethylenedioxy-allopregnan-11β-ol-3-one.

EXAMPLE I

A solution of 11.5 g. (2.1 mol equivalents) of bromine in 150 cc. of glacial acetic acid was added dropwise to a solution of 10 g. of dihydroallotestosterone in 250 cc. of acetic acid containing a few drops of 4 N hydrogen bromide in acetic acid. After five hours at room temperature, the mixture was poured into ice water and the precipitated dibromo derivative was collected, washed well with water, and dried. The dried material was refluxed for 20 hours with 20 g. of sodium iodide in 200 cc. of acetone and then kept at room temperature for an additional 12 hours. After dilution with water, the product was extracted with ether, washed with sodium thiosulfate solution and water, and the ether was removed under reduced pressure. The residue was crystallized from acetone-hexane, thus giving 2-iodo-testosterone.

To a stirred solution of 5 g. of the preceding compound in 50 cc. of dioxane, there was added a solution of 5 g. of sodium borohydride in 7.5 cc. of water and the mixture was kept at 10° C. overnight. The excess of reagent was destroyed by adding 5 cc. of acetic acid and the resulting solution was then concentrated to a small volume under reduced pressure. It was then diluted with water and the formed precipitate collected by filtration. Recrystallization from acetone-ether gave 2α-iodo-Δ⁴-androstene-3β,17β-diol.

To 400 cc. of 1% aqueous cupric sulfite solution, there was added 100 g. of zinc dust and the mixture was stirred at room temperature until the blue color was discharged. It was then filtered and the precipitate washed with water and ethanol, and air dried.

2.4 g. of the thus obtained zinc copper couple were added batchwise to a solution of 4 g. of 2α-iodo-Δ⁴-androstadiene-3β,17β-diol in 60 cc. of glacial acetic acid, and the mixture was stirred for 2 hours on the steam bath. The solid was filtered and the filtrate diluted with water and extracted with ether several times. The organic extract was washed with 10% sodium carbonate solution and water to neutral, dried over anhydrous sodium sulfate and evaporated to dryness. The residue was recrystallized from acetone-hexane, thus affording $\Delta^{2,4}$-androstadien-17β-ol.

A solution of 1 g. of the latter compound in 4 cc. of pyridine was treated with 2 cc. of benzoyl chloride and then heated on the steam bath for 1 hour. The mixture was then poured into ice water and the formed precipitate collected, washed with water and dried. Recrystallization from methylene-chloride-hexane afforded the benzoate of $\Delta^{2,4}$-androstadien-17β-ol.

EXAMPLE II

A mixture of 1 g. of $\Delta^{2,4}$-androstadien-17β-ol, 4 cc. of pyridine and 2 cc. of acetic anhydride was kept at room temperature overnight, poured into ice water, the formed precipitate was filtered, washed with water and dried. Crystallization from acetone-hexane gave the acetate of $\Delta^{2,4}$-androstadien-17β-ol.

In a similar manner, but using propionic, caproic, undecenoic and cyclopentylpropionic anhydrides as esterifying agents, there were produced the propionate, the caproate, the undecenoate and the cyclopentylpropionate of $\Delta^{2,4}$-androstadien-17β-ol.

EXAMPLE III

A solution of 10 g. of $\Delta^{2,4}$-androstadien-17β-ol obtained as described in Example I, in 200 cc. of pyridine was added to a mixture of 10 g. of chromium trioxide in 200 cc. of pyridine maintaining the temperature below 30° C. The reaction mixture was kept at room temperature overnight. It was then diluted with ethyl acetate, filtered through celite and the filtrate washed well with water, dried and evaporated to dryness. Crystallization from acetone-hexane afforded $\Delta^{2,4}$-androstadien-17-one.

A solution of 2 g. of the foregoing compound in 100 cc. of thiophene-free benzene was treated with 12 cc. of 4 N methylmagnesium bromide in ether and the mixture refluxed with the exclusion of moisture for 3 hours. The cooled mixture was cautiously treated with excess aqueous ammonium chloride solution and the product isolated by ethyl acetate extraction. The extract was washed with water, dried over anhydrous sodium sulfate and evaporated to dryness.

Recrystallization from methylene chloride-hexane afforded 17α-methyl-$\Delta^{2,4}$-androstadien-17β-ol.

By the same method but using ethyl, propyl and vinyl magnesium bromide instead of methyl magnesium bromide, there were produced 17α-ethyl-$\Delta^{2,4}$-androstadien-17β-ol, 17α-propyl-$\Delta^{2,4}$-androstadien-17β-ol, and 17α-vinyl-$\Delta^{2,4}$-androstadien-17β-ol.

EXAMPLE IV

By following the method described in Example I, 5 g. of 19-nor dihydroallotestosterone were converted successively into 2α,4α-dibromo-19-nor-androstan-17β-ol-3-one, 2α-iodo-19-nor-testosterone, 2α-iodo-$\Delta^4$-androstene-3β,17β-diol and $\Delta^{2,4}$-19-nor-androstadien-17β-ol.

Oxidation of the latter compound with chromium trioxide in pyridine, followed by treatment with methyl magnesium bromide, in accordance with the method of the preceding example gave 17α-methyl-19-nor-$\Delta^{2,4}$-androstadien-17β-ol.

EXAMPLE V

A solution of 1 g. of $\Delta^{2,4}$-androstadien-17-one in 30 cc. of anhydrous benzene was added, under nitrogen, to a solution prepared by dissolving 1.4 g. of potassium in 30 cc. of t-amyl alcohol. A slow current of purified acetylene was passed through the solution for 40 hours, whereupon the solution was diluted with water and extracted with benzene. The organic extracts were then washed to neutral and dried over anhydrous sodium sulfate. Evaporation of the solvent and chromatography of the residue on 70 g. of alkaline alumina gave in the hexane-benzene (2:3) fractions a product, which upon recrystallization from acetone-hexane afforded the pure 17α-ethynyl-$\Delta^{2,4}$-androstadien-17β-ol.

To a solution of 500 mg. of the preceding compound in 10 cc. of anhydrous benzene, there were added 100 mg. of p-toluenesulfonic acid and 2 cc. of propionic anhydride and the mixture was allowed to stand for 24 hours at room temperature, poured into ice and water, and the resulting mixture was stirred to effect hydrolysis of the excess of anhydride. The benzene layer was separated and washed with 10% sodium carbonate solution and water. Drying, evaporation and crystallization of the residue from ether-hexane produced the propionate of 17α-ethynyl-$\Delta^{2,4}$-androstadien-17β-ol.

EXAMPLE VI

To a solution of 2 g. of $\Delta^{2,4}$-androstadien-17-one in 250 cc. of absolute ether was added dropwise a solution of 10 molar equivalents of ethyl lithium in 50 cc. of ether with mechanical stirring and under an atmosphere of nitrogen. The mixture was further stirred for 48 hours at room temperature. After pouring into water, the resulting mixture was acidified with hydrochloric acid, stirring vigorously for 1 hour. The ether layer was separated, washed with water to neutral, dried over anhydrous sodium sulfate, filtered and the ether was evaporated to dryness. Recrystallization of the residue from acetone-hexane yielded 17α-ethyl-$\Delta^{2,4}$-androstadien-17β-ol, identical with the product obtained by Grignard reaction.

A mixture of 1 g. of the foregoing compound, 1 g. of p-toluenesulfonic acid monohydrate, 50 cc. of acetic acid and 25 cc. of acetic anhydride was kept for 1 hour at room temperature. It was then poured into water and stirred until the excess of anhydride had hydrolyzed. Isolation of the product by methylene chloride extraction and crystallization of the residue from acetone-ether gave the 17α-ethyl-$\Delta^{2,4}$-androstadien-17β-ol-acetate.

EXAMPLE VII

A solution of 5 g. of $\Delta^{2,4}$-androstadien-17-one in 100 cc. of anhydrous ether was added dropwise to a solution of propargyl magnesium bromide (prepared from 6.8 g. of propargyl bromide, 1.4 g. of magnesium and 200 cc. of ether). The mixture was refluxed with stirring for 5 hours, cooled and poured into 500 cc. of 5% ammonium chloride solution; the ether layer was separated, washed with water to neutral, dried over anhydrous sodium sulfate and evaporated to dryness under vacuum. Crystallization of the residue from methanol furnished 17α-propargyl-$\Delta^{2,4}$-androstadien-17β-ol.

EXAMPLE VIII

By following the esterification method described in Example IV, 17α-methyl-$\Delta^{2,4}$-androstadien-17β-ol and 17α-methyl-19-nor-$\Delta^{2,4}$-androstadien-17β-ol were treated with acetic, caproic and cyclopentylpropionic anhydrides in benzene solution and in the presence of p-toluenesulfonic acid, thus producing the corresponding esters.

EXAMPLE IX

Example V was repeated but using 19-nor-$\Delta^{2,4}$-androstadien-17-one as starting material. There were thus obtained 17α-ethynyl-19-nor-$\Delta^{2,4}$-androstadien-17β-ol and its propionate.

EXAMPLE X

A mixture of 15 g. of 2α,4α-dibromo-allopregnane-3,20-dione described by M. Rubin et al. in J. Am. Chem. Soc. 73, 2338 (1951), 350 cc. of acetone and 15 g. of sodium iodide was refluxed for 21 hours. After dilution with water, the product was extracted with ether, washed with sodium thiosulfate solution and water, and the ether was removed under reduced pressure. The residue was crystallized from acetone-hexane, thus giving 2-iodo-progesterone.

A solution of 5 g. of sodium borohydride in 15 cc. of water was added with stirring to a solution of 10 g. of the above compound in 150 cc. of dioxane. The mixture was kept at 10° C. overnight, the excess reagent was decomposed by addition of acetic acid, the resulting solution concentrated to small volume in vacuo and diluted with water. The product was extracted with ethyl acetate, the extract washed with water, dried and evaporated.

Chromatography of the residue of 50 times its weight of neutral alumina gave the pure 2α-iodo-$\Delta^4$-pregnene-3β,20β-diol.

To 400 cc. of 1% aqueous cupric sulfate solution, there was added 100 g. of zinc dust and the mixture was stirred until the blue color was discharged. It was then filtered and the precipitate washed with water and ethanol, and air dried.

12 g. of the thus obtained zinc-copper couple were added to a solution of 2 g. of 2α-iodo-$\Delta^4$-pregnene-3β,20β-diol in 60 cc. of acetic acid and the mixture was stirred on the steam bath for 1 hour 40 minutes. The solid was filtered and the filtrate diluted with water and extracted with ether. The organic extract was washed to neutral, dried over anhydrous sodium sulfate and evaporated to dryness. Recrystallization of the residue from heptane gave $\Delta^{2,4}$-pregnadien-20β-ol.

A solution of 1 g. of the above diene in 20 cc. of acetone was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. It was stirred for 2 minutes further at 0–5° C. and diluted with water. The precipitate was collected, washed with water and dried under vacuum, thus affording a crude product which upon recrystallization from acetone-hexane gave $\Delta^{2,4}$-pregnadien-20-one.

EXAMPLE XI

A cooled solution of 4 g. of $\Delta^{2,4}$-pregnadien-20-one obtained as described in the preceding example, in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the 21-iodo compound, namely 21-iodo-$\Delta^{2,4}$-pregnadien-20-one. This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol-water, thus yielding $\Delta^{2,4}$-pregnadien-21-ol-20-one acetate.

A solution of 2 g. of the above compound in 50 cc. of methanol was treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing $\Delta^{2,4}$-pregnadien-21-ol-20-one.

EXAMPLE XII

A mixture of 1 g. of $\Delta^{2,4}$-pregnadien-21-ol-20-one, 4 cc. of pyridine and 2 cc. of propionic anhydride was kept at room temperature overnight, poured into ice water, the formed precipitate was filtered, washed with water and dried. Crystallization from acetone-hexane gave the propionate of $\Delta^{2,4}$-pregnadien-21-ol-20-one.

By the same method but using caproic, trimethylacetic or cyclopentylpropionic anhydride as esterifying agents, there were produced the corresponding esters of $\Delta^{2,4}$-pregnadien-21-ol-20-one.

EXAMPLE XIII

A solution of 5 g. of 17,20;20,21-bismethylenedioxy-allopregnan-3-one in 100 cc. of glacial acetic acid was heated to 50° C. and treated dropwise, with stirring with 4.35 g. of bromine (2.1 molar equivalents) in 25 cc. of acetic acid. The mixture was kept for 3 hours at room temperature and then poured into water. The product was extracted with methylene chloride and the organic extract washed with water, sodium carbonate solution and water to neutral, dried over anhydrous sodium sulfate and evaporated to dryness under reduced pressure. Crystallization from acetone-ether gave the pure 17,20;20,21-bismethylenedioxy-2α,4α-dibromo-allopregnan-3-one.

5 g. of the preceding dibromo compound were refluxed for 20 hours with sodium iodide in acetone solution, thus giving 17,20;20,21-bismethylenedioxy-2α-iodo-$\Delta^4$-pregnen-3-one. Upon reduction of the above compound with sodium borohydride, followed by treatment with zinc-copper couple in accordance with the method described in Example I, there was produced 17,20;20,21-bismethylenedioxy-$\Delta^{2,4}$-pregnadiene.

1 g. of the latter compound was heated on the steam bath with 20 cc. of 80% formic acid for 10 minutes or 80% acetic acid for 3 hours, cooled, diluted with water, and the precipitate was collected, washed with water, dried, and recrystallized from acetone-hexane, thus affording $\Delta^{2,4}$-pregnadiene-17$\alpha$,21-diol-20-one.

EXAMPLE XIV

The preceding example was repeated but using 17,20;20,21 - bismethylenedioxy - allopregnan-11$\beta$-ol-3-one as starting material. There were thus obtained successively 17,20;20,21 - bismethylenedioxy-2$\alpha$,4$\alpha$-dibromo-allopregnan-11$\beta$-ol-3-one; 17,20;20,21-bismethylenedioxy-2$\alpha$-iodo-$\Delta^4$-pregnen-11$\beta$-ol-3-one; 17,20;20,21-bismethylenedioxy-2$\alpha$-iodo-$\Delta^4$-pregnene-3$\beta$,11$\beta$-diol; 17,20;20,21-bismethylenedioxy-$\Delta^{2,4}$-pregnadien-11$\beta$-ol and $\Delta^{2,4}$-pregnadiene-11$\beta$,17$\alpha$,21-triol-20-one.

500 mg. of the latter compound were treated with 1 cc. of propionic anhydride and 2 cc. of pyridine by following the method of Example XII, thus affording the 21-propionate of $\Delta^{2,4}$-pregnadiene-11$\beta$,17$\alpha$,21-triol-20-one.

EXAMPLE XV

In accordance with the oxidation method described in Example X, 2 g. of 17,20;20,21-bismethylenedioxy-$\Delta^{2,4}$-pregnadien, 11$\beta$-ol, intermediate of the preceding example, was treated with an 8 N solution of chromic acid in acetone, thus producing 17,20;20,21-bismethylenedioxy-$\Delta^{2,4}$-pregnadien-11-one. The protecting group was then hydrolyzed by reflux with 60% formic acid, by following the method of Example XIII to produce $\Delta^{2,4}$-pregnadiene-17$\alpha$,21-diol-11,20-dione.

Esterification of the latter compound with acetic, caproic and cyclopentylpropionic anhydride in pyridine solution gave the 21-acetate, the 21-caproate and the 21-cyclopentylpropionate of $\Delta^{2,4}$-pregnadiene-17$\alpha$,21-diol-11,20-dione.

EXAMPLE XVI

A solution of 5 g. of $\Delta^{2,4}$-pregnadiene-17$\alpha$,21-diol-20-one in 25 cc. of pyridine was cooled to 0° C. Under stirring, there was added 1. g. of tosyl chloride, the mixture was kept for 16 hours at 0° C., diluted with 100 cc. of chloroform, washed with dilute hydrochloric acid, water, aqueous sodium bicarbonate solution and again with water, dried over anhydrous sodium sulfate and then evaporated to dryness under reduced pressure. Thus there was obtained the crude 21-tosylate of $\Delta^{2,4}$-pregnadiene-17$\alpha$,21-diol-20 one.

A solution of 2.5 g. of the above crude compound in 100 cc. of glacial acetic acid was treated with 7 g. of sodium iodide and the mixture was refluxed for 2 hours, poured into ice water and extracted several times with methylene chloride; the extracts were combined, washed successively with aqueous sodium carbonate solution, sodium sulfite solution and water and then evaporated. By crystallization of the residue from acetone-hexane, there was obtained $\Delta^{2,4}$-pregnadien-17$\alpha$-ol-20-one.

In a similar manner, $\Delta^{2,4}$-pregnadiene-17$\alpha$,21-diol-11,20-dione was converted into its 21-tosylate and finally into $\Delta^{2,4}$-pregnadien-17$\alpha$-ol-11,20-dione.

EXAMPLE XVII

A solution of 3 g. of $\Delta^{2,4}$-pregnadiene-11$\beta$,17$\alpha$,21-triol-20-one in 20 cc. of a mixture of pyridine and chloroform (9:1) was cooled to 0° C. Under stirring, there was added batchwise 1.0 g. of methanesulfonyl chloride; the mixture was kept for 14 hours at 0° C., diluted with 60 cc. of chloroform, washed with dilute hydrochloric acid, water, aqueous sodium bicarbonate solution and again with water, dried over anhydrous sodium sulfate and the solvent was evaporated under reduced pressure. Thus there was obtained the crude 21-mesylate of $\Delta^{2,4}$-pregnadiene-11$\beta$,17$\alpha$,21-triol-20-one.

A solution of the crude compound in 120 cc. of acetone was treated with 2 g. of sodium iodide and refluxed for 2 hours. Most of the acetone was removed by distillation, the residue was diluted wtih water and the precipitate formed was collected by filtration, washed with water and dried under vacuum. There was thus obtained the crude 21-iodo-$\Delta^{2,4}$-pregnadiene-11$\beta$,17$\alpha$-diol-20-one.

To a solution of this iodo compound in 120 cc. of methanol and 12 cc. of water, there was added 3 g. of sodium bisulfite and the mixture was refluxed for 2 hours. Most of the methanol was removed by distillation under reduced pressure, the residue was diluted with water and the precipitate was collected, washed with water, dried and recrystallized from acetone-hexane. There was thus obtained $\Delta^{2,4}$-pregnadiene-11$\beta$,17$\alpha$-diol-20-one.

EXAMPLE XVIII

In accordance with the method of Example XV, 1 g. of $\Delta^{2,4}$-pregnadien-17$\alpha$-ol-11,20-dione was esterified with acetic anhydride in benzene solution and in the presence of p-toluenesulfonic acid, thus producing the corresponding acetate.

By the same method, $\Delta^{2,4}$-pregnadiene-17$\alpha$,21-diol-20-one was converted into $\Delta^{2,4}$-pregnadiene-17$\alpha$,21-diol-20-one diacetate.

EXAMPLE XIX

A solution of 5 g. of allopregnane-11$\beta$,21$\alpha$-diol-3,20-dione-21-acetate in 200 cc. of glacial acetic acid was treated with 2.1 molar equivalents of bromine in acetic acid, by following the method of Example I, to produce 2$\alpha$,4$\alpha$ - dibromo - allopregnan - 11$\beta$,21 - diol - 3,20-dione-21-acetate.

Upon reaction of the above compound with sodium iodide in acetone solution there was obtained 2$\alpha$-iodo-$\Delta^4$-pregnene-11$\beta$,21-diol-3,20-dione-21-acetate.

To a solution of 2 g. of the latter compound in 40 cc. of tetrahydrofuran there was added a solution of 2 g. of sodium borohydride in 2 cc. of water. The mixture was kept at room temperature overnight, and the excess reagent was decomposed by addition of acetic acid. Water was added and the product extracted with ethyl acetate, the extract was washed to neutral, dried and evaporated. Crystallization of the residue from acetone-hexane gave 2$\alpha$ - iodo - $\Delta^4$ - pregnene - 3$\beta$,11$\beta$,20$\beta$,21-tetral-21-monoacetate.

The foregoing compound was treated with zinc copper couple in acetic acid by following the method of Example X, to produce $\Delta^{2,4}$-pregnadien-11$\beta$,20$\beta$,21-triol-acetate, which in turn was oxidized with the chromium trioxide-pyridine complex, thus affording $\Delta^{2,4}$-pregnadien-21-ol-11,20-dione-acetate.

1 g. of the preceding acetate was dissolved in 30 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing $\Delta^{2,4}$-pregnadien-21-ol-11,20-dione.

The foregoing compound was then submitted to the reactions described in Example XVI, to produce $\Delta^{2,4}$-pregnadien-21-ol-11,20-dione-tosylate and $\Delta^{2,4}$-pregnadien-11,20-dione.

We claim:
1. A compound of the following formula:

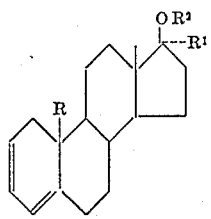

wherein R is selected from the group consisting of hydrogen and methyl; $R^1$ is selected from the group consisting of hydrogen, lower alkyl, lower alkenyl and loyer alkynyl; and $R^2$ is selected from the group consisting of hydrogen and a hydrocarbon carboxylic acyl group of less than 12 carbon atoms.

2. $\Delta^{2,4}$-androstadien-17β-ol.
3. $\Delta^{2,4}$-19-nor-androstadien-17β-ol.
4. 17α-methyl-$\Delta^{2,4}$-androstadien-17β-ol.
5. 17α-ethyl-$\Delta^{2,4}$-androstadien-17β-ol.
6. 17α-vinyl-$\Delta^{2,4}$-androstadien-17β-ol.
7. 17α-ethynyl-$\Delta^{2,4}$-androstadien-17β-ol.
8. 17α-ethynyl-19-nor-$\Delta^{2,4}$-androstadien-17β-ol.
9. The hydrocarbon carboxylic acid esters of less than 12 carbon atoms of $\Delta^{2,4}$-androstadien-17β-ol.
10. The acetate of $\Delta^{2,4}$-androstadien-17β-ol.
11. The acetate of 17α-methyl-$\Delta^{2,4}$-androstadien-17β-ol.
12. A compound of the following formula:

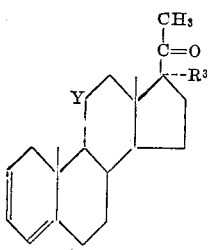

wherein $R^3$ is selected from the group consisting of hydrogen, hydroxy, and acyloxy of less than 12 carbon atoms and Y is selected from the group consisting of β-hydroxy and keto.

13. $\Delta^{2,4}$-pregnadien-11,20-dione.
14. $\Delta^{2,4}$-pregnadien-17α-ol-11,20-dione.
15. $\Delta^{2,4}$-pregnadiene-11β,17α-diol-20-one.
16. A compound of the following formula:

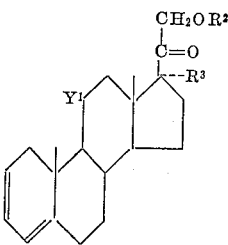

wherein $R^2$ is selected from the group consisting of hydrogen and a hydrocarbon carboxylic acyl group of less than 12 carbon atoms; $R^3$ is selected from the group consisting of hydrogen, hydroxy and acyloxy group of less than 12 carbon atoms; and $Y^1$ is selected from the group consisting of hydrogen, β-hydroxy and keto.

17. $\Delta^{2,4}$-pregnadien-21-ol-20-one.
18. $\Delta^{2,4}$-pregnadiene-17α,21-diol-20-one.
19. $\Delta^{2,4}$-pregnadiene-17α,21-diol-11,20-dione.
20. $\Delta^{2,4}$-pregnadiene-11β,17α,21-triol-20-one.
21. The acetate of $\Delta^{2,4}$-pregnadien-17α-ol-11,20-dione.
22. The 21-propionate of $\Delta^{2,4}$-pregnadiene-11β,17α,21-triol-20-one.
23. The hydrocarbon carboxylic acid esters of less than 12 carbon atoms of $\Delta^{2,4}$-pregnadiene-17α-21-diol-20-one.
24. In the process for making $\Delta^{2,4}$-steroids selected from the group consisting of androstane and pregnane compounds the step which comprises treatment of the 2α-iodo-3β-hydroxy-$\Delta^4$-steroid with zinc-copper couple in acetic acid.

No references cited.